Figure 1:
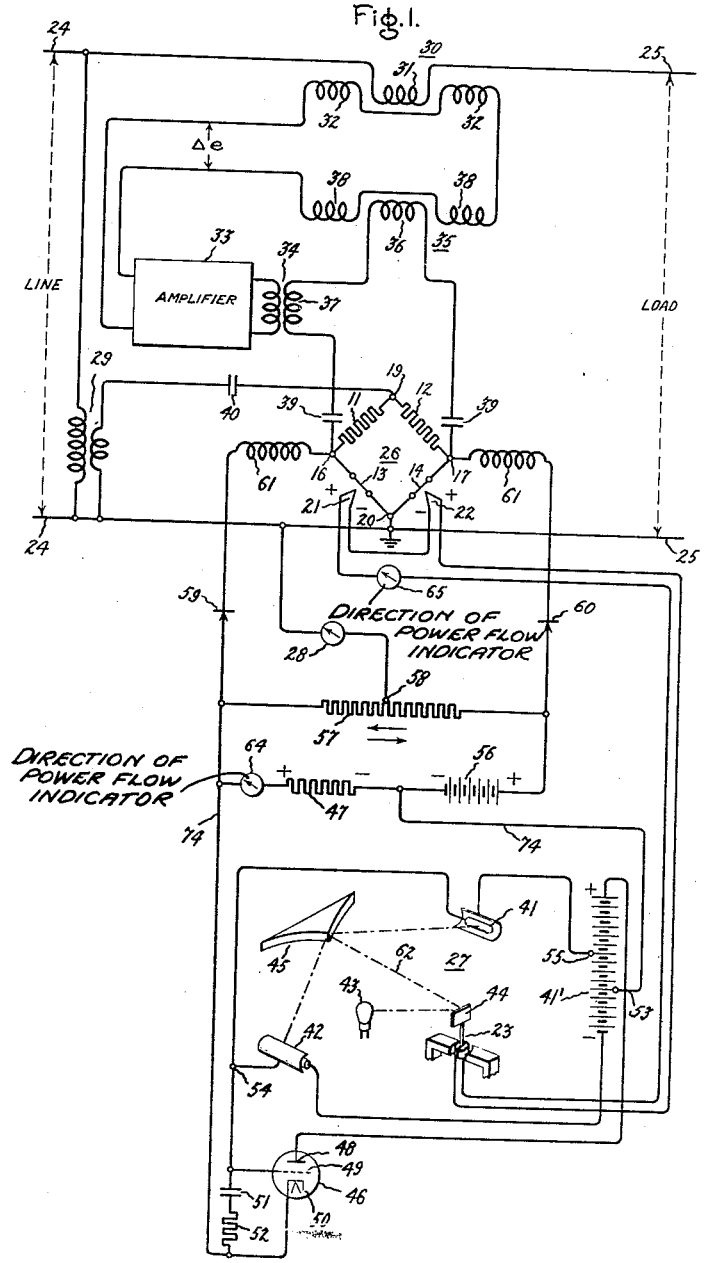

Aug. 8, 1939 — C. W. LA PIERRE — 2,169,101
THERMOCOUPLE WATTMETER
Filed April 29, 1938 — 2 Sheets-Sheet 1

Inventor:
Cramer W. La Pierre,
by Harry E. Dunham
His Attorney.

Aug. 8, 1939.  C. W. LA PIERRE  2,169,101
THERMOCOUPLE WATTMETER
Filed April 29, 1938    2 Sheets-Sheet 2
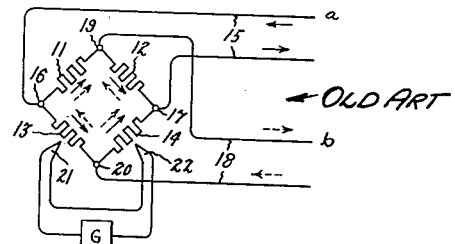
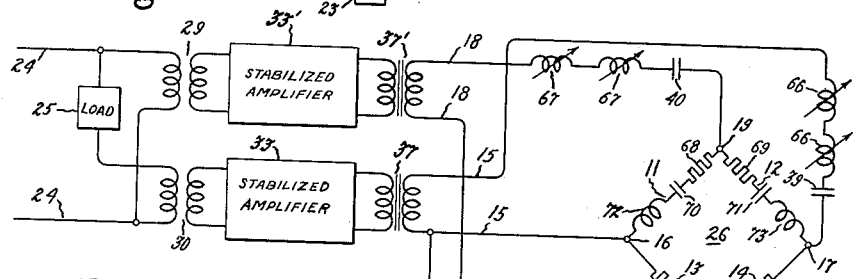
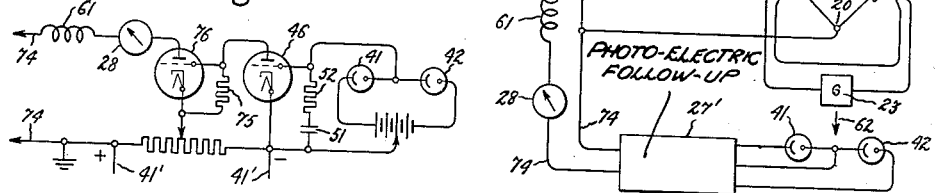
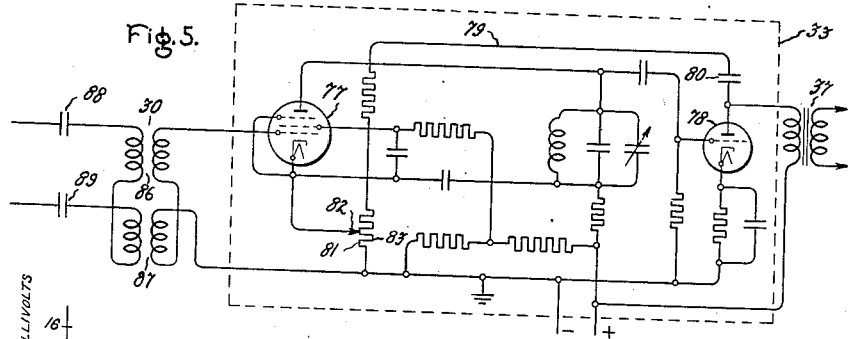
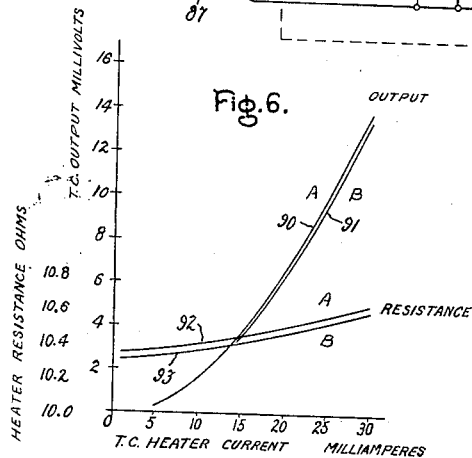
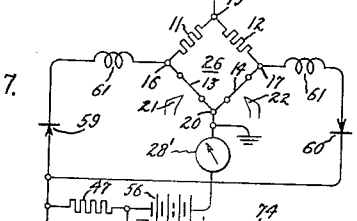
Inventor:
Cramer W. La Pierre,
by Harry E. Dunham
His Attorney.

Patented Aug. 8, 1939

2,169,101

UNITED STATES PATENT OFFICE 2,169,101

THERMOCOUPLE WATTMETER

Cramer W. La Pierre, Schenectady, N. Y., assignor to General Electric Company, a corporation of New York Application April 29, 1938, Serial No. 205,120

6 Claims. (Cl. 171—95)

My invention relates to electrical measuring devices and concerns particularly apparatus for measuring a quantity such as power, reactive component of power or some other quantity representing a product.

It is an object of my invention to provide a product measuring arrangement which is suitable for high frequencies such as radio frequencies, as well as for low frequencies, and which is unaffected by frequency variations.

It is a further object of my invention to provide apparatus which is highly sensitive and accurate although it imposes only a low burden on the circuit in which power or some other product is being measured.

Still another object of my invention is to provide a product measuring arrangement which may be used for transmitting indications or records to a distance.

It is furthermore an object of my invention to provide an arrangement in which thermocouples following substantially the same law of operation may be employed without any need for matching the characteristics of the thermocouples except for obtaining high speed response.

It is also an object of my invention to provide an arrangement in which thermocouples may be used which do not follow the square law.

Still another object of the invention is to provide an arrangement in which the null method may be used in obtaining the thermocouple response, obviating any necessity for loading the thermocouples.

It is also an object of my invention to provide an arrangement using thermocouples in which the response time is relatively short regardless of the response time of the thermocouples.

Another object is to provide measuring apparatus employing discharge tubes which is relatively independent of the tube constants and of variations in voltage of auxiliary circuits.

Other and further objects and advantages will become apparent as the description proceeds.

In carrying out my invention in its preferred form I provide a four-arm bridge or square, two arms of which consist of thermal-current-responsive devices that are independent of frequency variations, such as thermocouples, thermal current expansion members, or lamp filament and light responsive device combinations, e. g., and I supply currents representing two quantities to be multiplied such as voltage and current to two different pairs of diagonally opposite points or terminals at the corners of the bridge or square so that the two currents to be multiplied flow in the same direction in one thermal-current-responsive arm of the bridge, and in opposite directions in the other thermal-current-responsive arm of the bridge. For reasons which will later be explained, the difference in heating of the two thermal-current-responsive arms represents the product of the instantaneous values of the currents or the power of the measured circuit if the arrangement is used as a wattmeter. In order to make the apparatus independent of the response characteristic of the thermocouples and in order to employ the null method of response I do not measure the difference in heating of the thermocouples directly, but supply an auxiliary current to one of the thermocouples to equalize the heating, and I measure the auxiliary current. The auxiliary current may be a direct current or a current of a different frequency from that in the main circuit and is supplied to the thermocouple which would otherwise be the cooler one. In order to make the measurement automatic I provide a suitable regulator or follow-up arrangement such as a photo-electric follow-up for automatically supplying sufficient auxiliary current to maintain the thermocouples at the same temperature.

The invention may be understood more readily from the following detailed description when considered in connection with the accompanying drawings and those features of the invention which are believed to be novel and patentable will be pointed out in the claims appended hereto. In the drawings Figure 1 is a circuit diagram of one embodiment of my invention representing the same schematically. Figure 2 is a circuit diagram of an old bridge arrangment. Figure 3 is a circuit diagram of another embodiment of my invention. Figure 4 is a detailed circuit diagram of the photoelectric follow-up arrangement represented schematically in Figure 3. Figure 5 is a circuit diagram of the stabilized amplifiers represented symbolically by rectangles in Figure 3. Figure 6 is a graph illustrating the characteristics of thermocouples which may be employed in the apparatus. Figure 7 is a fragmentary view of a modification of the circuit of Figure 1. Like reference characters are utilized throughout the drawings to designate like parts.

My apparatus utilizes the fundamental principle that the instantaneous product of two electric currents may be measured by a pair of square law current responsive devices such as thermal-current-responsive devices connected as two arms of a four-arm bridge if the two currents to be multiplied are passed through opposite diagonals of the bridge. For example, in Figure 2, a four-arm bridge of a type known in the art is shown which comprises a pair of resistors 11 and 12, a thermocouple heater 13, and a thermocouple heater 14. A pair of conductors 15 is connected to diagonally opposite points 16 and 17 of the bridge and a pair of conductors 18 is connected to diagonally opposite points 19 and 20 of the bridge. Associated with the thermocouple heating resistor 13 is a thermocouple 21, and associated with the thermocouple heating resistor 14 is a thermocouple 22. A sensitive current responsive device such as a galvanometer 23 is provided and the thermocouples 21 and 22 are connected thereto in opposition. The current flowing in the conductors 15 represents the instantaneous value of a quantity such as the voltage in a measured electrical circuit and the current flowing in the conductors 18 represents the instantaneous value of a quantity such as the current in the measured electrical circuit. Of course, the instantaneous product of the currents in conductors 15 and 18 represents the output or power of the measured electrical circuit in question. For the sake of convenience arrows have been provided representing the direction of current flow at some given instant; the solid line arrows representing the current supplied by conductors 15 and the dotted line arrows representing the current supplied by the conductors 18. It will be seen that the currents are additive in the thermocouple heater 14 but subtractive in the thermocouple heater 13.

If one assumes that the heating of the thermocouples 21 and 22 is proportional to the squares of the currents flowing in the heaters and represents the currents of conductors 15 and 18 by letters $a$ and $b$ respectively, the output of the thermocouple 22 will be proportional to $(a+b)^2$ and the output of the thermocouple 21 will be proportional to $(a-b)^2$. The response of the galvanometer 23 is then proportional to $(a+b)^2-(a-b)^2$ which equals $4ab$. It is seen, therefore, that the deflection of the galvanometer 23 represents the product of the two quantities $a$ and $b$. However, due to heat losses and other causes the outputs of thermocouples and other thermal-current-responsive devices are not strictly proportional to the square of the currents flowing therein and, therefore, inaccuracies will result from the apparatus illustrated in Figure 2. Further inaccuracies will result if the thermocouples are not matched. Although it is relatively easy to make two thermocouples alike, it is very difficult to make both follow a particular law in addition.

In order to make the measurement independent of the fact that the thermocouples 21 and 22 may not follow the square law, in order to make it unnecessary for the thermocouples 21 and 22 to be accurately matched so long as they follow substantially the same shape of response curve and in order to avoid imposing a load on the thermocouples 21 and 22, I provide an arrangement for passing sufficient auxiliary current through what would otherwise be the colder thermo-couple heater, in this case the resistor 13, to bring the thermocouples 21 and 22 to the same temperature. Consequently the outputs of the thermocouples 21 and 22 balance and the thermocouple circuit operates in accordance with the null method. For example, in the arrangement of Figure 1, which represents an application of my principle of measuring power in a high frequency circuit, the line side of the circuit is represented by the terminals 24 and the load side by the terminals 25. A current representing the voltage between the terminals 24 is applied between the diagonally opposite terminals or corners 19 and 20 of the bridge or square 26 and a current representing the current in the measured circuit 24—25 is applied between diagonally opposite terminals or corners 16 and 17 of the bridge 26.

A suitable source of auxiliary current of a different frequency from the frequency of the line 24, in this case a direct current source included in a photoelectric follow-up device 27 is provided for supplying the auxiliary current to one or the other of the heaters 13 or 14. The photoelectric follow-up device 27 includes a galvanometer 23 responsive to the difference in outputs of the thermocouples 13 and 14 and the arrangement is such as to control the auxiliary current automatically to maintain the thermocouples at the same temperature. The output circuit of the follow-up arrangement 27 includes a current responsive device 28 which may take the form of an indicating instrument, a recorder, telemeter, or any other desired type of current responsive device, and the response of the instrument 28 is dependent upon the auxiliary current supplied to the bridge. Therefore the instrument 28 may be calibrated in terms of the power of the circuit 24—25. Since the instrument 28 is simply connected in series and the current therein is automatically adjusted regardless of the resistance of the leads, it will be apparent that remote indications may be obtained very easily by placing the instrument 28 at a distance and running only two conductors to the distant point.

The elements of the apparatus of Figure 1 will now be considered more in detail. In order that the apparatus may impose as small a burden as possible upon the circuit in which the power is to be measured, and in order to facilitate making the full-scale currents supplied to both diagonals of the bridge 26 substantially the same, one or both of the connections to the bridge 26 from the circuit 24 may be made through amplifiers. Transformers may also be provided for converting the input quantities to currents of suitable magnitude for use in the bridge. In the apparatus of Figure 1 a step-down potential transformer 29 is provided, connected on the primary side to the line 24 and on the secondary side to the diagonally opposite corners 19 and 20 of the bridge or square 26. A current transformer 30 is provided having a primary winding 31 in series with the circuit 24—25 and having a pair of series connected secondary windings 32. An amplifier 33 is provided connected on the input side to the secondary windings 32, and an output transformer 34 is connected to the output side of the amplifier 33.

To insure accuracy of the ratios of the current transformer 30 and the amplifier 33, a comparison transformer 35 is provided, having a primary winding 36 and secondary windings 38. The primary winding 36 is connected to the secondary winding 37 of the output transformer 34 in series with the diagonally opposite corners 16 and 17 of the bridge 26. The secondary windings 38 are connected in series with the input side of the amplifier 33 and the secondary windings 32 of the current transformer 30. The turn ratios of the transformers and the amplification ratio of the amplifier 33 are so chosen that the voltage of the windings 32 exceeds that of the windings 38 by a value $\Delta e$ for a given primary current. The turn ratios may or may not be such that more current flows in the winding 36 than in the primary winding 31 according to the normal current of the measured circuit, but in either case the amplifier 33 acts as a power amplifier providing adequate voltage to force a current through the bridge 26 accurately proportional to the current in the primary winding 31. The amplifier 33 is preferably a resistance coupled amplifier of the class A type, that is, having a negative grid bias exceeding any peak alternating voltages which may be applied on the input side.

In order to keep direct current out of the transformers, series condensers 39 may be connected in series with the current connections 16 and 17 of the bridge 26 and a series condenser 40 may be connected in series with the potential connections 19 and 20 of the bridge 26.

The follow-up arrangement 27 which may be of the type described in my Patent 1,897,850 granted February 14, 1933, includes a source of direct current in the form of a battery of cells 41', a pair of saturable type photoelectric cells 41 and 42, a light beam source 43, a mirror 44 carried by the galvanometer 23, light beam dividing reflectors 45, a current controlling electric valve or discharge tube 46, and an output-voltage-producing resistor 47. The discharge tube 46 is of the three-element type having an anode 48, a control grid 49, and a cathode 50, which may be of the indirectly heated type, the heating circuit not being shown. For maintaining the required potential difference between the cathode 50 and the control electrode 49, a condenser 51 is provided in the control electrode circuit and for avoiding hunting, the damping resistor 52 is connected in series with the condenser 51 in the control electrode circuit formed between the control electrode 49 and the cathode 50. The anode 48 is connected to the positive end of the battery 41' and the cathode 50 is connected through the resistor 47 to a point 53 near the negative end of the battery 41'. The photoelectric cells 41 and 42 are connected in series between intermediate point 55 of the battery 41' and the negative end of the battery 41'. The common terminal 54 of the photoelectric cells 41 and 42 is connected to the control electrode 49 of the discharge tube 46.

In order that auxiliary current may be supplied to whichever of the thermocouples 13 or 14 is the colder, an additional direct current source which may take the form of a battery 56 is provided. The output resistor 47 of the photoelectric follow-up system 27 is connected in series with the battery 56 across a resistor 57, and the connection is such that points of like polarity of the resistor 47 and the battery 56 are connected together. For example, the end of the resistor 47 which is negative due to the flow of current produced by the battery 41' is connected to the negative terminal of the battery 56. The mid-point 58 of the resistor 57 is connected to the corner 20 of the bridge or square 26 and the current responsive device 28 is included in series with this connection. The resistor 57 is connected at either end to the opposite corners 16 and 17 of the bridge 26, and rectifiers 59 and 60 are included in the connections to the points 16 and 17. In order to keep high frequency current from the line 24 out of the direct current circuits, choke coils 61 are preferably connected in series with the rectifiers 59 and 60.

The following action takes place when current is drawn by the load 25 from the line 24. The potential transformer 29 causes a current to flow through the points 19 and 20 proportional to the line voltage. The current transformer 30 causes a current to be supplied to the amplifier 33 proportional to the current supplied to the load 25 and this current is amplified by amplifier 33 so as to cause a current to flow through the points 16 and 17 proportional to the line current and in phase therewith. However, in case the slight load upon the current transformer or some variation in amplifier tube characteristics should produce some inaccuracy in the ratio or in the phase relationship between the line current and that supplied to the bridge 26, the voltage $\Delta e$ would rise or fall or shift in phase to bring about the necessary correction in amplifier output current.

Let it be assumed that the direction of power flow is such that the thermocouple 13 tends to be the colder thermocouple. Accordingly, the output of the thermocouple 13 will be smaller than the output of the thermocouple 14 and the mirror 44 of the galvanometer 33 will be deflected to the right causing the light beam 62 to be split unevenly by the mirror 45 and produce greater illumination of the photoelectric cell 41. Thus the photoelectric cell 41 is caused to carry a greater current by reason of the characteristics of such photoelectric cells and a charging current flows in the condenser 51 to equalize the currents in the photoelectric follow-up arrangement 27. This increases the charge of the condenser 51 and the potential of the control electrode of the tube 46, which causes a greater current to flow through the discharge tube 46. Greater current flows through the resistor 47, causes the potential difference across the resistor 47 to exceed that of the battery 56 and causes current to flow in the resistor 57 from the left-hand side to the right-hand side making the left-hand side positive and the right-hand side negative.

Consequently, current flows through the current rectifier 59 and through the thermocouple heater 13 raising the temperature thereof. No direct current flows through the thermocouple heater 14 from the rectifier 60, of course, for the reason that the right-hand end of the resistor 57 is negative, and current therefrom cannot pass through the rectifier 60. To prevent current flowing through the bridge arms 11 and 12 to the thermocouple heater 14, the arms 11 and 12 may be of high resistance or may have condensers interposed as explained in connection with Figure 3. The charge of the condenser 51 and the potential of the control electrode 49 continue to rise until the current in the anode circuit of the discharge device 46 and therefore, indirectly the current supplied to the thermocouple heater 13 become sufficient to bring the thermocouples to the same temperature. Thereupon the galvanometer 23 brings the mirror 44 back to the mid-position at which the light beam 62 is split equally. The photoelectric cells 42 and 41 are then equally illuminated and draw equal currents causing the charge of the condenser 51 to remain constant. Therefore, the potential of the control electrode 49 remains constant as well as the direct current in the thermocouple heater 13. This auxiliary direct current flows through the current responsive instrument 28 in returning from the bridge 20 and depends in magnitude upon the power delivered by the line 24 of the measured circuit.

From the foregoing explanation it will be apparent that if the direction of power flow should change so that the load 25 was feeding power back in the line 24, the directions of the currents in the bridge 26 would change, the currents would be additive in the heater 13 and subtractive in the heater 14 making the heater 14 the colder one and necessitating the supply of auxiliary current to the heater 14 instead of the heater 13 to balance the outputs of the thermocouples. Accordingly, in this case, the galvanometer 23 would be deflected in the opposite direction causing the potential difference across the resistor 47 to fall until it was exceeded by the voltage of the battery 46. This would cause current to flow in the opposite direction in the resistor 57 making the right-hand end positive, permitting the current to flow to the thermocouple heater 14 and cutting off current from the thermocouple heater 13 by reason of the directional property of the rectifier 59. If desired, a device may be connected at 64 or 65 which is responsive to the direction of current, and therefore, serves as an indicator of the direction of power flow.

In order that the same instrument may be used for indicating the magnitude and the direction of power flow, the circuit of Figure 1 may be modified in the manner shown by the fragmentary circuit diagram of Figure 7. In this case a zero-center direct-current instrument 28' is employed, one of the rectifiers 60 has its terminals reversed and the output side of the photoelectric follow-up arrangement 27 is connected in series with the instrument 28'. If the potential difference across the resistor 47 exceeds that across the battery 56, auxiliary current flows through the rectifier 59 and raises the temperature of the thermocouple 21. On the other hand, if the potential difference of the battery 56 exceeds that of the resistor 47, auxiliary current flows through the rectifier 60 and heats the thermocouple 22.

In Figure 3, I have represented another embodiment of my invention in which the circuit for supplying auxiliary current is simplified by assuming that the thermocouple heater 13 would always be the colder thermocouple without auxiliary current. This assumption is justified if one pair of connections to the bridge 26 is reversed or the thermocouples are interchanged whenever the direction of power flow reverses between the line 24 and the load 25. In the arrangement of Figure 3, as in the case of Figure 1, a line 24 supplies power to a load 25, but in this case amplifiers are provided for producing both alternating currents flowing in the bridge 26. The amplifiers are represented by rectangles 33 and 33' and are provided with output transformers 37 and 37'. In order to maintain the power factor of the output circuit substantially unity, variable inductances 66 may be connected in series with the series condenser 39 in the current leads to the corners 16 and 17 of the bridge 26 and similarly variable inductances 67 may be connected in the potential leads to the corners 19 and 20 of the bridge 26. In the arrangement of Figure 3 the arms 11 and 12 of the bridge 26 include resistors 68 and 69, condensers 70 and 71, and inductances 72 and 73, respectively, preferably tuned substantially to balance the bridge 26 at the frequency principally to be employed. The condensers 70 and 71 serve to confine the auxiliary direct current to only one thermocouple and keep the bridge symmetrical both internally and with respect to the amplifiers 33 and 33'. The photoelectric follow-up arrangement is represented schematically in Figure 3 by a rectangle 27' from which leads are extended connected to the photoelectric cells 41 and 42 and the split light beam is represented schematically at 62 by an arrow. In this case, the output conductors 74 of the photoelectric follow-up arrangement 27' are connected between the corners 16 and 20 of the bridge 26 across the thermocouple heater 13. The choke coil 61 and the current responsive device 28 are included in this connection as in the arrangement of Figure 1.

The photoelectric follow-up circuit may be modified somewhat, if desired, for the sake of increased sensitivity as shown in Figure 4, by adding an additional discharge valve or discharge tube 76. The output of the discharge tube 46 of Figure 1 is passed through a resistor 75. The second discharge tube 76 has a control-electrode circuit including the resistor 75 so that variations in the output of the tube 46 produce variations in the control-electrode potential of the tube 76 thus amplifying the output of the tube 76 which represents the final output of the photoelectric follow-up device 27'.

If desired, the comparison transformer 35 of Figure 1 may be eliminated and instead stabilized amplifiers may be employed such as illustrated in Figure 5. Such amplifiers are represented by the rectangles 33 and 33' in Figure 3.

The amplifier circuit shown in Figure 5 is a conventional amplifier circuit including a five-element tube 77 in the first stage and a three-element tube 78 in the final stage with the exception that a degenerative or internal negative feed-back action is provided. The stabilizing effect is obtained by purposely designing the amplifier with excess amplification and then feeding back sufficient of the output voltage to the input side in such a manner as to reduce the overall amplification to the desired amount. This is analogous to the arrangement of Figure 1 using the comparison transformer 35 as an external feed-back. The feed-back feature is provided by a conductor 79 connected to the anode side of the tube 78 through a coupling condenser 80 and connected to the control-electrode circuit of the tube 77 through a resistor 81. In order to adjust the degree of degeneration, the resistor 81 may be provided with an adjustable tap 82, and the arrangement is such that the anode current of the tube 77 flows through the portion 83 of the resistor 81 below the tap 82. It will be seen that as the output of the amplifier 33 increases, greater voltage will be fed back to the resistor 83 increasing the potential of the tap 82, thereby decreasing the control-electrode potential of the tube 77. My invention is not limited to specific numerical relationships, but I have obtained satisfactory results by utilizing amplifiers which would have an excess gain of about 300 times if used as straight amplifiers, about two-thirds of the excess gain being lost by reason of the degeneration produced by the presence of the resistor 83 in the anode current of the first tube and the remainder being cut to about one-hundredth by the direct feed-back 79. The direct feed-back also reduces the effects of any change in the amplifier such as phase shift or amplification variation, etc. to about $\frac{1}{100}$ of what they would be without the feed-back. Thus with a direct feed-back of 100, a 10% change in the amplifier would produce only a $\frac{1}{10}$% error in the output.

In order that the amplifiers 33 and 33' may be alike, the input transformers 29 and 30 may be designed with ratios such as to give the same voltage output for full-scale voltage and current of the measured circuit. In order to avoid disturbance from stray fields or other interference, the input transformers 29 and 30 may be made astatic by providing two sets of windings 86 and 87 which are reversed in their relative physical positions. Input condensers 88 and 89 may likewise be provided in the case of high frequency measurements in order to prevent excess voltage drops in the input transformer primaries by resonating them to the approximate frequency of the measured circuit.

Figure 6 illustrates the characteristics of one pair of thermocouples which I have employed in my apparatus. The curves 90 and 91 represent relationships between thermocouple output in millivolts plotted along the vertical axis, and thermocouple heater current in milliamperes plotted along the horizontal axis. It will be seen that curves 90 and 91 do not represent strictly square law characteristics. However, they follow substantially the same law and I have found that the differences between curves 90 and 91 are insufficient to interfere with obtaining accuracy throughout the range of the apparatus. Curves 92 and 93 represent the resistances of the thermocouple resistors plotted in the vertical direction against thermocouple heater currents in milliamperes plotted in the horizontal direction. It will be seen that in the illustrative apparatus represented by the curves of Figure 6, the resistances of the thermocouples are not exactly matched. However, I have found that no appreciable inaccuracy was introduced thereby, and preferably I adjust the amplifiers and the transformers so that for the usual range of measurements the bridge is balanced with currents in the thermocouple heaters at approximately the mid-point of the curves 92 and 93 represented by the 20 milliampere abscissa.

In case one of the thermocouples should have a greater response time than the other, the faster thermocouple may be placed in the follow-up position, i. e. in the position designated by the reference numeral 21, in order to minimize overshoot, as I find the best results are obtained by making the apparatus slightly under-damped. Consequently, when reading negative power, it is advisable to reverse one of the input circuits to the bridge instead of transferring the output of the photoelectric apparatus 27 to the other thermocouple. Inasmuch as the thermocouples 21 and 22 are connected in opposition their response times do not affect the response time of the apparatus as a whole which is much less than that of either thermocouple. For example, with thermocouples having response times of from 10 to 15 seconds the instrument 28 reaches balance in from 2 to 4 seconds in apparatus which I have built using thermocouples which are not matched. If the thermocouples were accurately matched, the overall responsiveness could be infinitely greater than the response time of either thermocouple. Inexactness in matching the thermocouples results in increase of response time but has no effect upon the accuracy. In either case there is no need for the thermocouples to follow the square law.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A wattmeter comprising a bridge including four arms connected together to form a square, a pair of conductors connected to two opposite points of said square to serve as potential connections, a second pair of conductors connected to the two remaining opposite points of the square to serve as current connections, two adjacent arms of said bridge comprising thermocouple heaters, thermocouples associated with said thermocouple heaters, a current responsive device to which said thermocouples are connected in opposition, means for supplying auxiliary current to one or the other of said thermocouple heaters depending on the direction of power flow in the metered circuits, a controller for the auxiliary current, and a photoelectric follow-up device in operative relation between said current responsive device and said controller to keep the controller in the adjustment at which the thermocouple temperatures are balanced and no current flows in the current responsive device.

2. A wattmeter comprising a bridge including four arms connected together to form a square, a pair of conductors connected to two opposite points of said square to serve as potential connections, a second pair of conductors connected to the two remaining opposite points of the square to serve as current connections, two adjacent arms of said bridge comprising thermal-current-responsive devices, means for supplying auxiliary current to said thermal-current-responsive devices, means for blocking such auxiliary current from the warmer of the two thermal-current-responsive devices and means differentially responsive to the thermal-current-responsive devices for controlling the auxiliary current and bringing the colder of the two thermal-current-responsive devices to the temperature of the other one.

3. An alternating current product meter comprising a bridge including four arms connected together to form a square, a pair of conductors connected to two opposite points of said square to serve as connections for one of the currents to be multiplied, a second pair of conductors connected to the two remaining opposite points of the square to serve as connections for the other of the currents to be multiplied, two adjacent arms of said bridge comprising thermal-current-responsive devices, means for producing a light beam, means differentially responsive to said thermal-current-responsive devices for deflecting said light beam, a source of direct current for applying heating current to one of said thermal-current-responsive devices, a current controller therefor, a photoelectric follow-up arrangement responsive to the deflection of the light beam for increasing or decreasing the auxiliary direct current according to the direction of the deflection of the light beam, said differential responsive means creating a neutral position of the light beam when said thermal-current-responsive devices are at the same temperature, and means responsive to the magnitude of the auxiliary direct current.

4. A current product meter comprising a bridge including four arms connected together to form a square, a pair of conductors connected to two opposite points of said square to serve as connections for one of the currents to be multiplied, a second pair of conductors connected to the two remaining opposite points of the square to serve as connections for the other of the currents to be multiplied, means responsive to the relative values of resultant effects of current flowing in two adjacent arms of the said bridge, means for supplying auxiliary current to one of said two latter arms, means for adjusting said auxiliary current, and connecting means between the adjusting means and the relative current effect responsive means for maintaining the auxiliary current at a value giving a predetermined relationship between the resultant current effects in said last mentioned two adjacent arms of the bridge.

5. Apparatus responsive to the product of two currents comprising a bridge including four arms connected together to form a square, terminals at two opposite points of said square to serve as connections for one of said currents, a second pair of terminals at the two remaining opposite points of the square to serve as connections for the other of said currents, two adjacent arms of said bridge comprising thermal-current-responsive devices, means for supplying auxiliary current to one of said thermal-current-responsive devices, means differentially responsive to the two thermal-current-responsive devices for controlling the auxiliary current and maintaining a predetermined relationship between the temperatures of the two thermal-current-responsive devices.

6. Apparatus responsive to the product of two alternating currents comprising a bridge including four arms connected together to form a square, terminals at two opposite points of said square to serve as connections for one of said currents, a second pair of terminals at the two remaining opposite points of the square to serve as connections for the other of said currents, two adjacent arms of said bridge comprising impedances each including a capacitor, the two remaining adjacent arms of said bridge comprising current responsive elements, means for supplying adjustable direct current to one of said current responsive elements, and means responsive to the relative values of resultant effects of current flowing in the two current responsive elements for adjusting the direct current to maintain the direct current at a value giving a predetermined relationship between the resultant current effects in said current responsive elements.

CRAMER W. LA PIERRE.